United States Patent
Azar et al.

(10) Patent No.: US 6,788,312 B1
(45) Date of Patent: Sep. 7, 2004

(54) METHOD FOR IMPROVING QUALITY IN GRAPHICS PIPELINES THROUGH A FRAME'S TOP AND BOTTOM FIELD PROCESSING WITH CONDITIONAL THRESHOLDING AND WEIGHTING TECHNIQUES

(75) Inventors: Hassane S. Azar, Santa Clara, CA (US); Douglas Sim Dietrich, Jr., Campbell, CA (US); Duncan Andrew Riach, Mountain View, CA (US); Henry P. Moreton, Woodside, CA (US); Douglas H. Rogers, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 398 days.

(21) Appl. No.: 09/922,759

(22) Filed: Aug. 6, 2001

(51) Int. Cl.$^7$ ............................ G09G 5/02; G06T 1/20
(52) U.S. Cl. ........................................ 345/694; 345/506
(58) Field of Search ................................. 345/694, 419, 345/601, 581, 501, 530, 531; 348/745, 746

(56) References Cited

U.S. PATENT DOCUMENTS 6,333,744 B1    12/2001   Kirk et al. .................. 345/506
6,456,340 B1 *  9/2002    Margulis .................... 348/745
6,609,977 B1 *  8/2003    Shimizu et al. ............... 463/36

OTHER PUBLICATIONS

Philips Semiconductor, "Nexperia pnx8500", 2000.

Philips Semiconductor, "Nexperia pnx8320 Series", 2000.

Dutta, Santanu et al., "Viper: A Multiprocessor SOC for Advanced Set–Top Box and Digital TV Systems", IEEE, Sep. –Oct. 2001.

* cited by examiner

Primary Examiner—Kee M Tung
Assistant Examiner—A Blackman
(74) Attorney, Agent, or Firm—Silicon Valley IP Group, PC; Kevin J. Zilka

(57) ABSTRACT

A system, method and computer program product are provided for improving image quality in a graphics pipeline. Initially, a difference is detected between a first pixel of a first frame to be outputted and a corresponding second pixel of a second frame outputted before the first frame. Such difference may be representative of motion which is capable of reducing image quality. A pixel output is then modified if such a difference is detected. This is accomplished utilizing texturing hardware in the graphics pipeline. Thereafter, the pixel output is outputted via a progressive or interlaced display system.

16 Claims, 6 Drawing Sheets

METHOD FOR IMPROVING QUALITY IN GRAPHICS PIPELINES THROUGH A FRAME'S TOP AND BOTTOM FIELD PROCESSING WITH CONDITIONAL THRESHOLDING AND WEIGHTING TECHNIQUES

RELATED APPLICATION(S)

This application is related to a application entitled "GRAPHICS PIPELINE INCLUDING COMBINER STAGES" filed Mar. 22, 1999 and issued under U.S. Pat. No.: 6,333,744, naming David B. Kirk, Matthew Papakipos, Shaun Ho, Walter Donovan, and Curtis Priem as inventors, and which is incorporated herein by reference in its entirety.

FIELD OF THE INVENTION

The present invention relates to de-interlacing methods, and more particularly to improving de-interlacing in a graphics pipeline.

BACKGROUND OF THE INVENTION

Computer displays and televisions are known to utilize different display techniques; computer displays utilize a progressive non-interlaced display technique, while televisions utilize an interlaced technique. The progressive display technique creates fields for displaying wherein each field includes complete pixel information for the display. For example, if the computer display is a 640×480 pixel display, each line of a field would include the appropriate pixel information for display. Thus, each field displayed, which is done at a refresh rate of the computer display (e.g., 60 hertz, 75 hertz, 90 hertz, etc.), is complete. Because each field contains complete pixel information, no human perception filtering is required.

The interlaced technique has two types of fields: top fields and bottom fields. Top fields and bottom fields are also known as odd and even fields. A top field contains only the pixel information for odd lines, while the bottom field includes only pixel information for even lines. As such, both fields are incomplete. When displayed at the refresh rate of the television, which may be approximately 60 hertz in North America, the fields are presented at a rate of 30 top fields and 30 bottom fields per second. Because the interlaced display technique alternates between top fields and bottom fields, the human visual process filters the fields such that complete images are perceived by the viewer. To present interlaced video data on a progressive computer display, various techniques may be utilized.

One such technique is referred to as "bob." The bob technique scales a particular field by calculating additional data from the image data of the lines that are present on a given field. This technique works well for moving images but, for still images, creates fuzzy edges of the images, which degrades the video quality.

Another technique is referred to as a "weave" technique. Prior Art FIG. 1 illustrates deinterlacing of top and bottom fields using the weave technique. As shown, the scan lines in the bottom field are mapped to bottom lines on the display, and the scan lines in the top field are mapped to the top lines on the display. While this approach works ideally for stationary images, distracting artifacts are created when the image is moving, since the top and bottom fields are received at different times and describe the image (as seen at the video source) at slightly different moments in time. Typically, the temporal displacement between successive fields is 1/60th of a second. When an image moves, successive video fields present the image in a slightly different position.

If the object moves slowly, and the bottom field and the top field are shown together in the same frame, any edge becomes blurred or shadowed, as the two images appear close to one another. Another problem caused by the motion of the object is double-vision or ghosting, seen when the object is moving more quickly. One effect of the motion of the image is shown in Prior Art FIG. 1A. Two images may be presented, as the bottom lines of the image show one field and the top lines of the image show a different field. Because the top and bottom fields are from different times, combining the two images in a "static mesh" can produce a "tearing" or "feathering" around the edges of moving items. This effect is highly noticeable to many users.

Some progressive display systems rely on filters such as "flicker filters" to allow the progressive display systems to output images to an interlaced display such as a television. In the absence of such flicker filters, such systems alternately output one of the fields for each frame since a television is not equipped to output both fields produced by the progressive display system. This technique, however, suffers from aliasing due to the fact that it often takes each field a different amount of time to be produced by the progressive display system.

There is thus a need for reducing the negative effects of "tearing" or "feathering" in progressive display systems, and further abate these and other aliasing problems in progressive display systems that are equipped to output to an interlaced display system such as a television.

DISCLOSURE OF THE INVENTION

A system, method and computer program product are provided for improving image quality in a graphics pipeline. Initially, a difference is detected between a first pixel of a first frame to be outputted and a corresponding second pixel of a second frame outputted before the first frame. Such difference may be representative of motion which is capable of reducing image quality. A pixel output is then modified if such a difference is detected. This is accomplished utilizing texturing hardware in the graphics pipeline. Thereafter, the pixel output is outputted via a progressive or interlaced display system.

In one embodiment, the pixel output may be outputted to an interlaced display system. In such embodiment, the difference may involve R-values, G-values, or B-values. Moreover, flicker filtering may optionally be applied to the pixel output.

In another embodiment, the pixel output may be outputted to a progressive display system. In such embodiment, the aforementioned difference may involve a difference in luminance, chrominance, etc. that is indicative of motion.

A graphics pipeline is thus provided including texturing hardware adapted for detecting the difference between a first pixel of the first frame to be outputted and the corresponding second pixel of a second frame outputted before the first frame, and modifying a pixel output if the difference is detected. As such, the quality of the pixel output is improved.

In another embodiment, a system, method and computer program product are provided for improving image quality in a graphics pipeline on a per-pixel basis. Initially, a previous frame and a current frame are identified each including a first field and a second field. Further identified are a first pixel value of a pixel in one of the fields of the previous frame, and a second pixel value of a corresponding pixel in a corresponding one of the fields of the current frame. It is then determined whether a difference between the first pixel value and the second pixel value exceeds a predetermined threshold. If the difference exceeds the predetermined threshold, a pixel of the second field of the current frame is altered or modified to improve output picture quality when outputted.

As an option, the pixel of the second field of the current frame may be modified by combining a pixel value of the pixel of the second field of the current frame with a pixel value of a corresponding pixel of the second field of the previous frame. This may be accomplished utilizing a weighted average, or any other calculation.

Once altered, the modified pixel may be merged with a pixel of the first field of the current frame. Of course, any other output technique may be applied based on the particular output display system being utilized.

In one aspect of the present embodiment, the pixel values may include chrominance values, luminance values, R-values, G-values, B-values, etc. Similar to the previous embodiment, the present embodiment may be executed by texturing hardware in a graphics pipeline.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

DESCRIPTION OF THE PREFERRED EMBODIMENTS

The present invention is adapted for improving image quality in a graphics pipeline. This is accomplished by detecting a difference between a first pixel of a first frame to be outputted and a corresponding second pixel of a second frame outputted before the first frame. As an option, such difference may involve a difference in luminance, chrominance, RGB-values, or any other parameter that is capable of reflecting motion that has occurred between the first and second pixels. A pixel output may then be modified if a difference is detected for improving the resultant image quality. Various examples on how such pixel output may be modified will be set forth hereinafter in greater detail.

Figure 1:
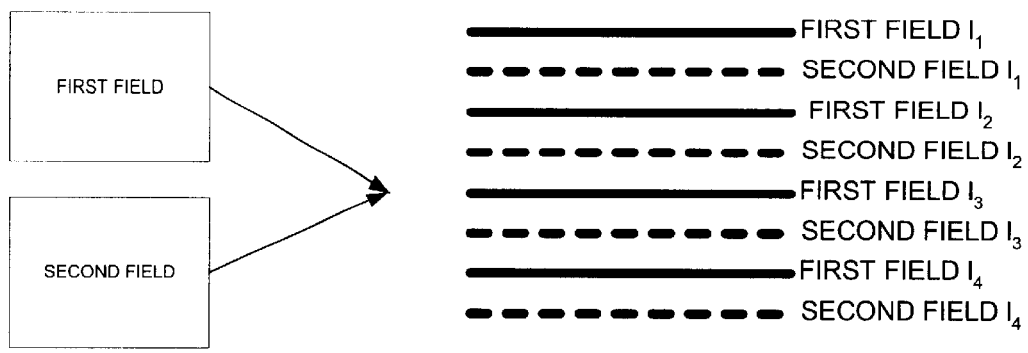
FIG. 1 illustrates deinterlacing of top and bottom fields, in accordance with the prior art.
Figure 1A:
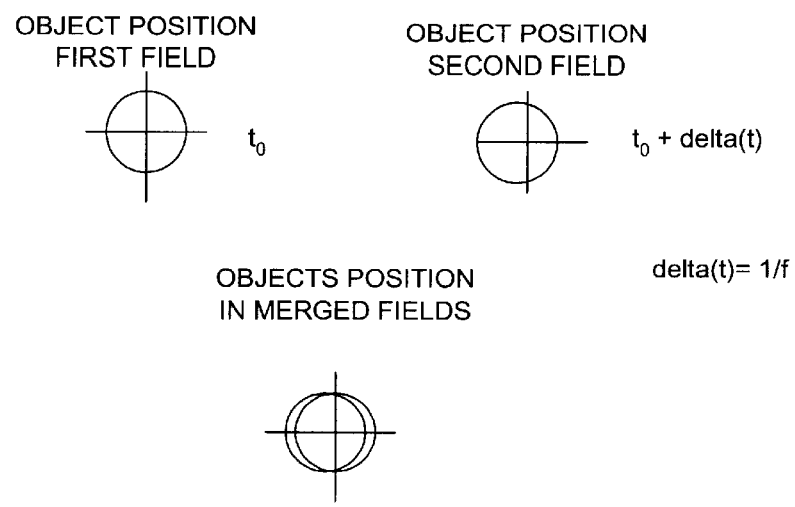
FIG. 1A illustrates feathering, in accordance with the prior art.
Figure 2:
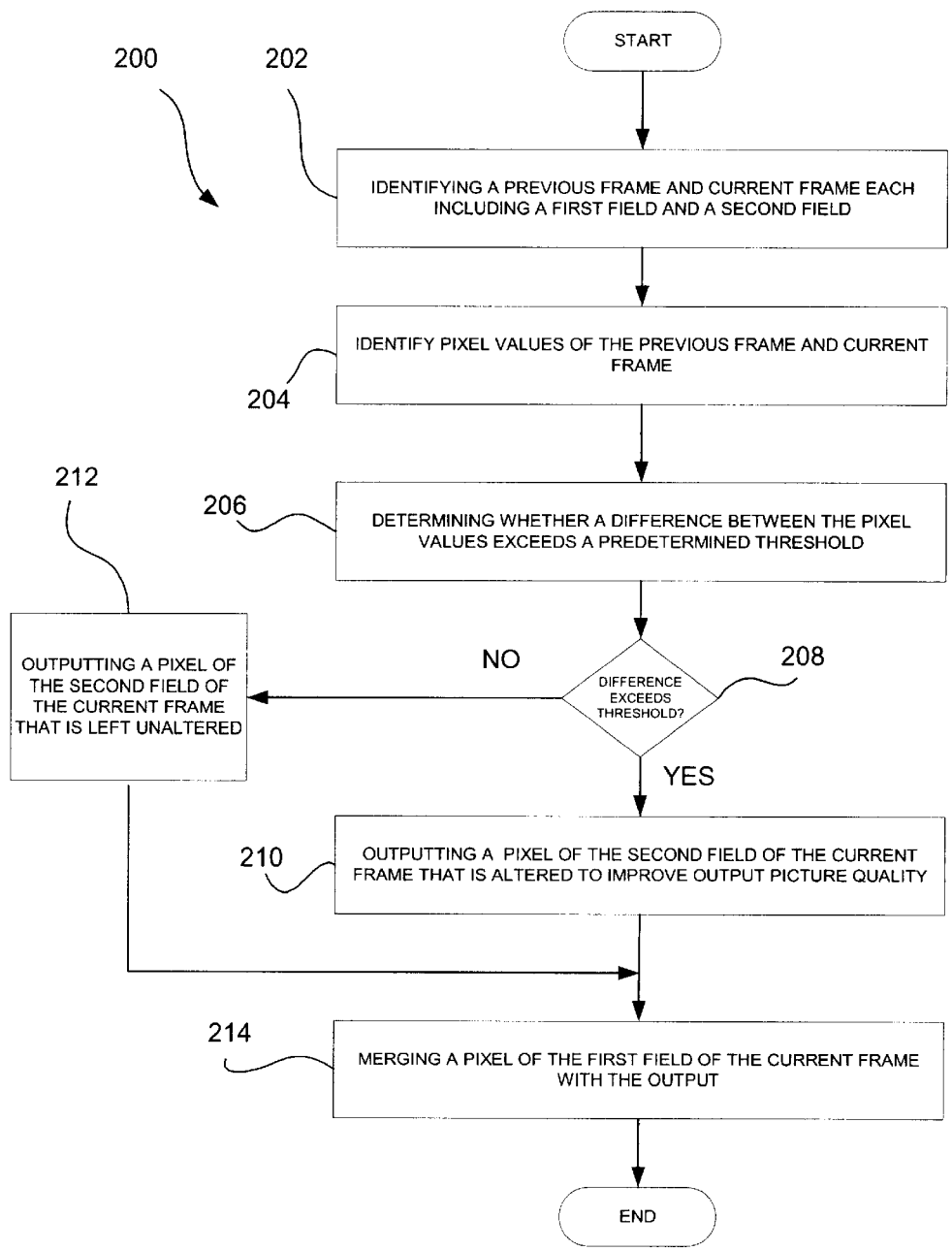
FIG. 2 illustrates one exemplary method by which the present invention improves image quality in a graphics pipeline.

FIG. 2 illustrates one exemplary method 200 by which the present invention improves image quality in a graphics pipeline. As shown, in operation 202, a previous frame and current frame are initially identified, each including a first field and a second field.

Figure 2A:
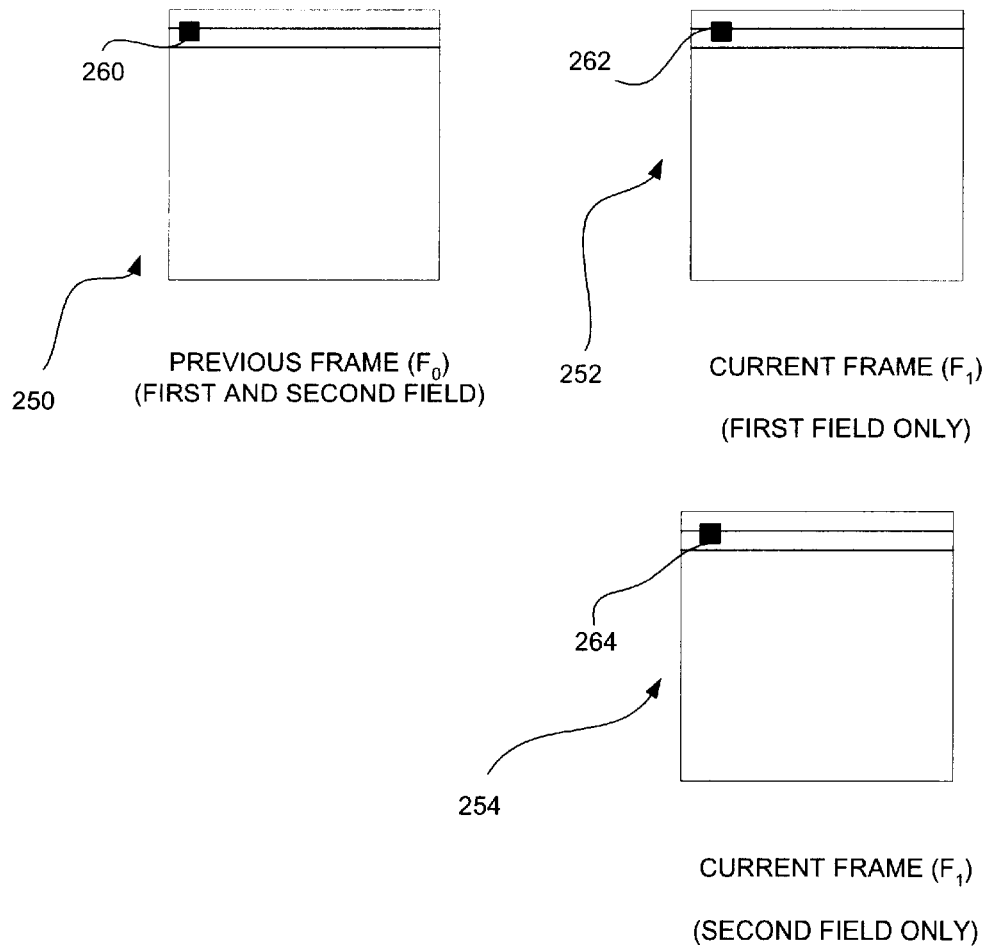
FIG. 2A illustrates the various fields of the frames involved with the method of FIG. 2.

FIG. 2A illustrates the previous frame 250 including the first and second fields. It should be noted that, in the context of the present discussion, the first and second fields may include either top or bottom fields. Also shown in FIG. 2A is the first field 252 of the current frame. Again, this first field 252 may either be a top or bottom field.

The present method 200 works to utilize the previous frame 250 for merging the pixels of the first field 252 of the current frame with the pixels of another field 254, in a manner that improves the quality of the resultant image by reducing the feathering effect and/or other image defects.

Since the present method 200 is operating on a per-pixel basis, various pixel values are identified. In the context of the present description, such pixel values may include a luminance value, chrominance value, R-value, G-value, B-value, or any other parameter value that is capable of reflecting motion. Specifically, first pixel values associated with pixels 260 of the first and second fields of the previous frame 250 are collected. Further identified are second pixel values of corresponding pixels (262 and 264) in the fields of the current frame, 252 and 254, respectively. See operation 204.

It is then determined whether a difference between the first pixel values and the second pixel values exceeds a predetermined threshold. See operation 206 and decision 208. If so, this indicates that a predetermined amount of motion has been detected which may result in the feathering effect and/or other image defects. As such, the pixel 264 of the second field 254 of the current frame is altered to improve the output picture quality before being outputted in operation 210.

As an option, the pixel 264 of the second field 254 of the current frame may be altered by combining a pixel value of the pixel 264 of the second field 254 of the current frame with a pixel value of the corresponding pixel 260 of the second field of the previous frame 250. This may be accomplished utilizing a weighted average, as will soon become apparent hereinafter.

If, however, the difference does not exceed the predetermined threshold, the pixel 264 of the second field 254 is left unaltered when outputted, as indicated in operation 212.

Next, in operation 214, the pixel 262 of the first field 252 of the current frame is merged with the output of operation 210 or 212. Of course, the output of operation 210 or 212 may be used in any desired manner based on the particular output display system. More optional particularities associated with the foregoing process will be set forth in greater detail during reference to the alternate embodiment shown in FIG. 2B.

Figure 2B:
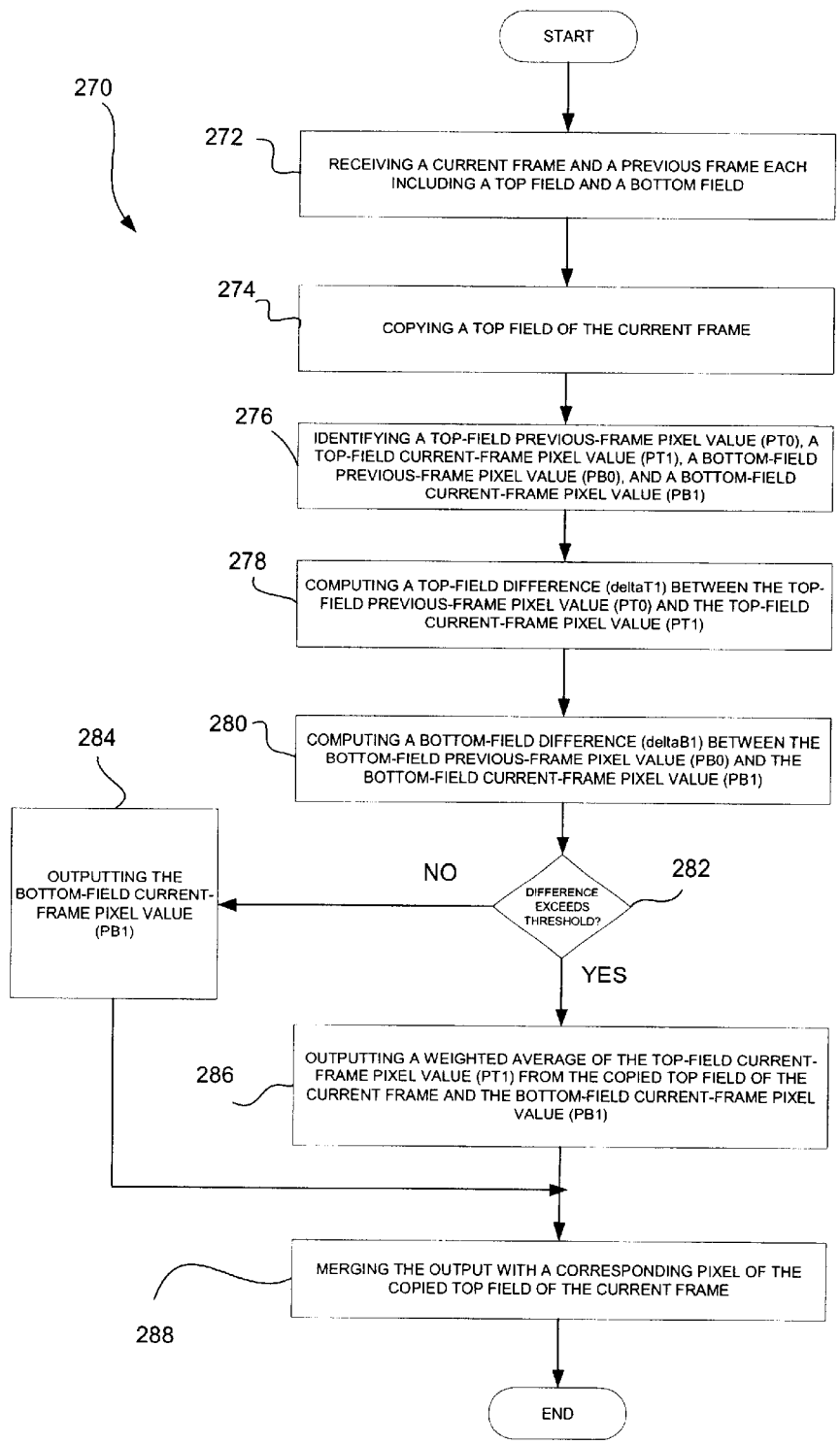
FIG. 2B illustrates a method for improving image quality in a graphics pipeline, in accordance with another embodiment of the present invention.

FIG. 2B illustrates a method 270 for merging a top field and a bottom field on a per-pixel basis, in accordance with another embodiment of the present invention. Initially, in operation 272, a current frame and a previous frame are identified each including a top field and a bottom field.

Next, in operation 274, a top field of the current frame is copied. With such information in hand, a plurality of values may be collected. Table 1 illustrates the particular values collected in operation 276. As mentioned earlier, such pixel values may include a luminance value, chrominance value, RGB-values or any other parameter value that is capable of reflecting motion.

TABLE 1

Top-field previous-frame pixel value ($P_{T0}$)
Top-field current-frame pixel value ($P_{T1}$)
Bottom-field previous-frame pixel value ($P_{B0}$)
Bottom-field current-frame pixel value ($P_{B1}$)

As shown in Table 1, a top-field previous-frame pixel value ($P_{T0}$) of a pixel in the top field of the previous frame is provided along with a top-field current-frame pixel value ($P_{T1}$) of a corresponding pixel in the top field of the current frame. Further provided are a bottom-field previous-frame pixel value ($P_{B0}$) of a corresponding pixel in the bottom field of the previous frame, and a bottom-field current-frame pixel value ($P_{B1}$) of a corresponding pixel in the bottom field of the current frame.

It should be noted that the top-field previous-frame pixel value ($P_{T0}$) may include an average of values of a plurality of neighboring pixels in the top field of the previous frame. Further, the top-field current-frame pixel value ($P_{T1}$) may include an average of values of a plurality of neighboring pixels in the top field of the current frame. The number of the values included in such averages may vary per the desires of the user. In an alternate embodiment, the pixel values may be used in the following calculations discretely depending on the performance and/or capabilities associated with the particular architecture with which the present technique is implemented.

Particular logic is then carried out. Table 2 illustrates the logic that is carried out utilizing the values set forth in Table 1.

TABLE 2

If [abs ($P_{T1} - P_{T0}$) > $Th_0$] OR [abs ($P_{B1} - P_{B0}$) > $Th_1$]
then OUTPUT = $x*P_{T1} + y*P_{B1}$
else OUTPUT = $P_{B1}$ In operations 278 and 280, a top-field difference ($\Delta_T$) between the top-field previous-frame pixel value ($P_{T0}$) and the top-field current-frame pixel value ($P_{T1}$) is then computed along with a bottom-field difference ($\Delta_B$). The bottom-field difference ($\Delta_B$) is a difference between the bottom-field previous-frame pixel value ($P_{B0}$) and the bottom-field current-frame pixel value ($P_{B1}$). As shown in Table 2, the top-field difference ($\Delta_T$) and the bottom-field difference ($\Delta_B$) may be absolute values for the purpose of determining a magnitude of the differences.

It is then determined whether the top-field difference [abs($P_{T1}-P_{T0}$)] exceeds a first threshold ($Th_0$) or the bottom-field difference [abs($P_{B1}-P_{B0}$)] exceeds a second threshold ($T_{h1}$). If the top-field difference [abs($P_{T1}-P_{T0}$)] does not exceed the first threshold ($Th_0$) and the bottom-field difference [abs($P_{B1}-P_{B0}$)] does not exceed the second threshold ($Th_1$), the bottom-field current-frame pixel value ($P_{B1}$) is outputted. See operation 284.

On the other hand, if the top-field difference [abs($P_{T1}-P_{T0}$)] exceeds the first threshold ($Th_0$) or the bottom-field difference [abs($P_{B1}-P_{B0}$)] exceeds the second threshold ($Th_1$), a weighted average of the top-field current-frame pixel value ($P_{T1}$) from the copied top field of the current frame and the bottom-field current-frame pixel value ($P_{B1}$) [$x*P_{T1}+y*P_{B1}$] is outputted. See operation 286. Of course, the threshold may vary. Further, the requirement that only one of differences exceeds the threshold is optional. In other words, the OR operation in Table 2 may be optionally replaced with an AND operation.

The values of the coefficients, x and y, of the weighted average [$x*P_{T1}+y*P_{B1}$] may be varied per the desires of the user. In one embodiment, x may equal 0.8 and y may equal 0.2. Of course, such weighted average [$x*P_{T1}+y*P_{B1}$] may vary for the purpose of improving picture quality.

Figure 2C:
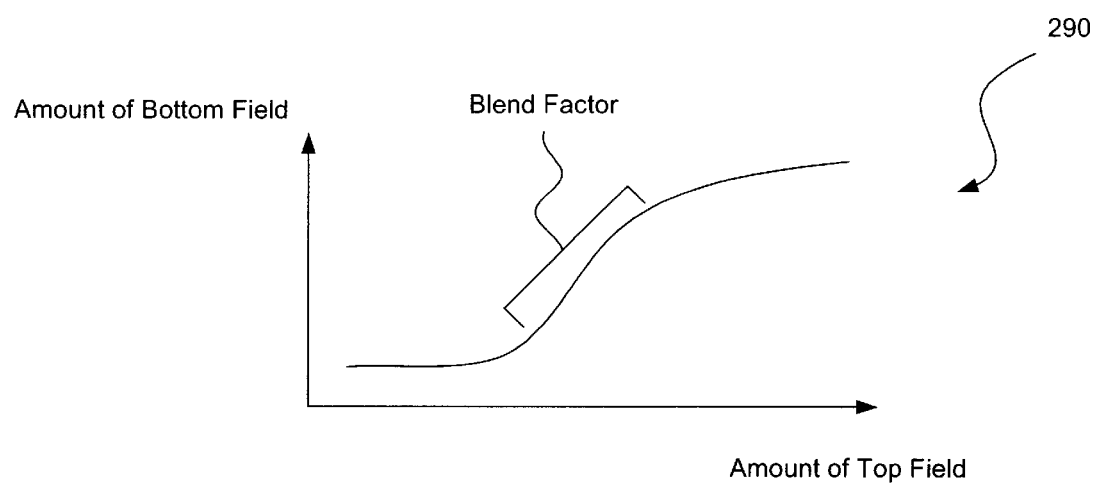
FIG. 2C shows a function by which the pixels of a frame may be blended, in accordance with one embodiment.

FIG. 2C shows a function 290 by which the pixels of a frame may be blended, in accordance with one embodiment. As shown, a blend factor in the range shown may be used to combine the two pixel values. As an option, use of this function may provide a substitute for the weighted average calculations set forth hereinabove. Of course, any desired technique of blending the pixel values may be utilized per the desires of the user.

Finally, in operation 288, the output of operation 284 or 286 may be merged with a corresponding pixel value of the copied top field of the current frame. Of course, the output of operation 284 or 286 may be used in any desired manner based on the particular output display system.

In one embodiment, the present technique may be executed by texturing hardware in a graphics pipeline. One exemplary architecture will now be set forth during the description of FIG. 3. It should be noted that such architecture is for illustrative purposes only, and should not be construed as limiting in any manner. In other words, the principles set forth herein may be applied in any desired architecture environment involving or not involving texturing hardware.

Figure 3:
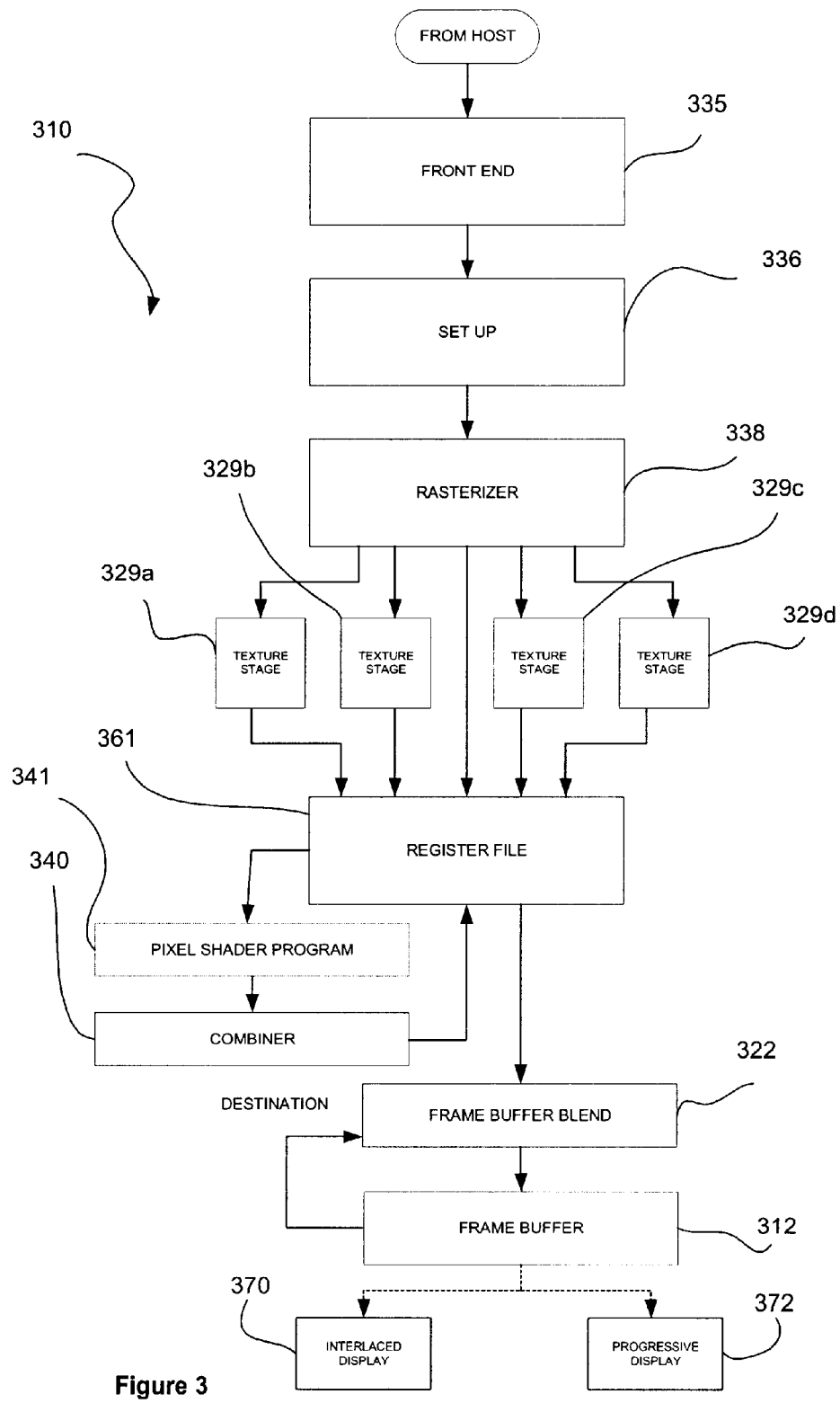
FIG. 3 is a block diagram illustrating a graphics pipeline in accordance with one embodiment.

FIG. 3 is a block diagram illustrating a graphics pipeline in accordance with one embodiment. The pipeline 310 includes a plurality of stages for rendering pixels defining a three dimensional image to a frame buffer 312 and frame buffer blending module 322 from which the image may be provided at an output stage, typically an output display (370 or 372). It should be noted that the present invention may be utilized in the context of any desired architecture.

As shown in FIG. 3, the graphics pipeline 310 includes front end, setup, and rasterizer stages 335, 336, and 338. The front end stage 335 at which a plurality of triangles defining an output image is received and decoded. The front end stage 335 receives from an application program the data defining each of the vertices of each triangle to appear in the output image being defined in the frame buffer 312. This data may include the three dimensional world coordinates of each of the vertices of each triangle, red/green/blue color values (diffuse color values) at each of the vertices, and texture coordinates fixing positions on a texture map for each of the vertices for each texture modifying the color values of each triangle.

The front end stage 335 determines the manner and order in which the pixels defining a triangle will be processed to render the image of the triangle. When this processing order has been determined, the front end stage 335 passes the data defining the vertices of the triangle to a setup stage 336. The setup stage 336 carries out a number of processes known to those skilled in the art that make the operations of generating pixels and applying textures to those pixels progress rapidly. The processes actually carried out by the setup stage 336 may vary depending on the particular implementation of the graphics accelerator. In some circuitry, certain of these processes are implemented by a rasterizer stage 338 and texture stages 329a, 329b, 329c, and 329d which follow the setup stage or by the host central processing unit.

The setup stage 336 utilizes the world space coordinates provided for each triangle to determine the two dimensional coordinates at which those vertices are to appear on the two dimensional screen space of an output display. If the vertices of a triangle are known in screen space, the pixel positions vary linearly along scan lines within the triangle in screen space and may be determined.

The setup stage 336 and the rasterizer stage 338 together use the three dimensional world coordinates to determine the position of each pixel defining each of the triangles. Similarly, the color values of a triangle vary linearly from vertex to vertex in world space. Consequently, setup processes based on linear interpolation of pixel values in screen space, linear interpolation of depth and color values in world space, and perspective transformation between the two spaces will provide pixel coordinates and color values for each pixel of each triangle. The end result of this is that the rasterizer stage generates in some sequence red/green/blue color values (conventionally referred to as diffuse color values) for each pixel describing each triangle.

The setup stage 336 and the rasterizer stage 338 also cooperate in the computation of the texture coordinates of each pixel in each triangle and send those texture coordinates to a plurality of texture stage a plurality of texture stages 329a, 329b, 329c, and 329d. The texture stages 329a, 329b, 329c, and 329d are adapted to produce texture values. In other embodiments, additional texture stages may be incorporated into the pipeline 310 per the desires of the user.

The texture stages 329a, 329b, 329c, and 329d are adapted to receive input signals which include information at the pixels of a triangle being rendered for different textures to be mapped to the triangle. The outputs produced by the texture stages 329a, 329b, 329c, and 329d are sequences of texture values defining different sequences of textures to be mapped to the triangle the pixels for which are simultaneously being furnished by the rasterizer stage 328. For example, in the context of the method 270 of FIG. 2B, the outputs may include the pixel values set forth in Table 1.

In addition to the multiple texture stages, the pipeline 310 of the present embodiment also includes a combiner stage 340. The combiner stage 340 is capable of receiving input from a plurality of possible sources. For example, the combiner stages may each utilize as input, among other values, the output texture values produced by either of the texture stages 329a, 329b, 329c, and 329d, the diffuse color output of the rasterizer stage 338, the output of any other combiner stage, and input signals defining various factors useful in combining various textures and colors together.

The combiner stage 340 allows the diffuse color image furnished by the rasterizer stage 338 to be combined with each of the textures during the same pass through the pipeline 310. These stages also allow a plurality of other functions to be accomplished which greatly accelerate the operation of the pipeline 310. For example, the various operations of the method 270 of FIG. 2B may be carried out by the combiner stage 340. See Table 2.

As an option, a pixel shader program 341 may be used in conjunction with the combiner stage 340. It should be noted that any well-known pixel shader program 341 may be used in context of the present embodiment.

A register file stage 361 is provided as input to the combiner stage 340. The register file stage 361 includes a plurality of registers in which operands furnished by the rasterizer stage 338 and texture stages 329a, 329b, 329c, and 329d to be utilized by the combiner stage 340 are placed. The operands used in any operation by the combiner stage 340 are selected from the register file stage 361 in accordance with control instructions provided by a program.

As shown in FIG. 3, the output may be sent to an interlaced display system 370. As mentioned earlier, one or more fields may be outputted to the interlaced display system 370. Moreover, flicker filtering may optionally be applied to the output. It should be noted that flicker filtering essentially blends the value of vertically adjacent pixels to decrease the differences in adjacent lines of two fields. This dramatically reduces the noticeable image flicker often associated with progressive display systems that are equipped to output to a television. Also, flicker filtering is quite beneficial if a field update is missed. In another embodiment, the output may be sent to a progressive display system 372.

Table 3 illustrates exemplary logic with which the methods of FIGS. 2 and 2B may be carried out in the context of the architecture of FIG. 3.

TABLE 3

Tex0 = Bottom-field previous-frame pixel value ($P_{B0}$)
Tex1 = Top-field current-frame pixel value ($P_{T1}$) (Ave)
Tex2 = Bottom-field current-frame pixel value ($P_{B1}$)
Tex3 = Top-field previous-frame pixel value ($P_{T0}$) (Ave)
factor0 = 0.5 − temporal_threshold0 ($Th_0$) // default
    value for temporal_threshold0 = 16/255
factor1 = 0.5 − temporal_threshold1 ($Th_1$) // default
    value for temporal_threshold1 = 16/255
spare0 and spare1 = combiners registers
// *** stage 1
// spare0.alpha = Tex2 − Tex0
// spare0.rgb = Tex0 − Tex2
// *** stage 2
// spare1.alpha = Tex3 − Tex1
// spare1.rgb = Tex1 − Tex3
// *** stage 3
// spare0.alpha = spare0.alpha + spare0.rgb    // == ABS(Tex2 − Tex0)
// spare0.rgb = spare1.alpha + spare1.rgb    // == ABS(Tex3 − Tex1)
// *** stage 4
// spare0.alpha = spare0.alpha + (0.5 − factor0)
// spare1.alpha = spare0.rgb + (0.5 − factor1)
// *** stage 5
// spare0.rgb = (spare0.alpha >= 0.5) ? 0 : 1
// *** stage 6
// spare1.rgb = (spare1.alpha >= 0.5) ? 0 : 1
// *** stage 7
// spare0.rgb = spare0.rgb*spare1.rgb /// == 1 if
((ABS(Tex2 − Tex0) < Th0) && (ABS(Tex3 − Tex1) < Th1)),
0 otherwise
// *** final output
// Output general form: (A*B) + ((1−A)*C) + D
// A = spare0.rgb // 1 if woven pixel or 0 if bob-ed pixel
// Output = (A*Tex2) + ((1−A)*Tex1

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A method for improving image quality in a graphics pipeline on a per-pixel basis, comprising;

(a) identifying a previous frame and a current frame each including a first field and a second field;

(b) identifying a first pixel value of a pixel in one of the fields of the previous frame, and a second pixel value of a corresponding pixel in a corresponding one of the fields of the current frame;

(c) determining whether a difference between the first pixel value and the second pixel value exceeds a predetermined threshold; and (d) if the difference exceeds the predetermined threshold, outputting a pixel of the current frame that is altered to improve output picture quality;

wherein if the difference exceeds the predetermined threshold, merging a pixel of the first field of the current frame with the corresponding pixel of the second field of the current frame that is altered to improve output picture quality;

wherein if the difference does not exceed the predetermined threshold, merging a pixel of the first field of the current frame with a corresponding pixel of the second field of the current frame that is left unaltered;

wherein the pixel of the second field of the current frame is altered by combining a pixel value of the pixel of the second field of the current frame with a pixel value of a corresponding pixel of the second field of the previous frame.

2. The method as recited in claim 1, wherein the second field includes at least one of a top field and a bottom field.

3. The method as recited in claim 1, wherein the pixel values include chrominance values.

4. The method as recited in claim 1, wherein the pixel values include luminance values.

5. The method as recited in claim 1, wherein the pixel values include at least one of R-values, G-values, and B-values.

6. The method as recited in claim 1, wherein the method is executed by texturing hardware in a graphics pipeline.

7. A method for improving image quality in a graphics pipeline on a per-pixel basis, comprising:
   (a) identifying a previous frame and a current frame each including a first field and a second field;
   (b) identifying a first pixel value of a pixel in one of the fields of the previous frame, and a second pixel value of a corresponding pixel in a corresponding one of the fields of the current frame;
   (c) determining whether a difference between the first pixel value and the second pixel value exceeds a predetermined threshold; and
   (d) if the difference exceeds the predetermined threshold, outputting a pixel of
       the current frame that is altered to improve output picture quality;
       wherein a pixel of the second field of the current frame is altered by combining a pixel value of the pixel of the second field of the current frame with a pixel value of a corresponding pixel of the second field of the previous frame.

8. The method as recited in claim 1, wherein the pixel value of the pixel of the second field of the current frame is combined with the pixel value of the corresponding pixel of the second field of the previous frame utilizing a weighted average.

9. A system for improving image quality in a graphics pipeline on a per-pixel basis, comprising;
   (a) logic for identifying a previous frame and a current frame each including a first field and a second field;
   (b) logic for identifying a first pixel value of a pixel in one of the fields of the previous frame, and a second pixel value of a corresponding pixel in a corresponding one of the fields of the current frame;
   (c) logic for determining whether a difference between the first pixel value and the second pixel value exceeds a predetermined threshold; and
   (d) logic for outputting a pixel of the current frame that is altered to improve output picture quality if the difference exceeds the predetermined threshold;
       wherein if the difference exceeds the predetermined threshold, merging a pixel of the first field of the current frame with the corresponding pixel of the second field of the current frame that is altered to improve output picture quality;
       wherein if the difference does not exceed the predetermined threshold, merging a pixel of the first field of the current frame with a corresponding pixel of the second field of the current frame that is left unaltered;
       wherein the pixel of the second field of the current frame is altered by combining a pixel value of the pixel of the second field of the current frame with a pixel value of a corresponding pixel of the second field of the previous frame.

10. A method for improving image quality in a graphics pipeline on a per-pixel basis, comprising;
    (a) receiving a current frame and a previous frame each including a top field and a bottom field;
    (b) copying a top field of the current frame;
    (c) identifying a top-field previous-frame pixel value ($P_{T0}$) of a pixel in the top field of the previous frame, a top-field current-frame pixel value ($P_{T1}$) of a corresponding pixel in the top field of the current frame, a bottom-field previous-frame pixel value ($P_{B0}$) of a corresponding pixel in the bottom field of the previous frame, and a bottom-field current-frame pixel value ($P_{B1}$) of a corresponding pixel in the bottom field of the current frame;
    (d) computing a top-field difference ($\Delta_T$) between the top-field previous-frame pixel value ($P_{T0}$) and the top-field current-frame pixel value ($P_{T1}$);
    (e) computing a bottom-field difference ($\Delta_B$) between the bottom-field previous-frame pixel value ($P_{B0}$) and the bottom-field current-frame pixel value ($P_{B1}$);
    (f) determining whether both the top-field difference ($\Delta_T$) exceeds a first threshold ($Th_0$) and the bottom-field difference ($\Delta_B$) exceeds a second threshold ($Th_1$);
    (g) if the top-field difference ($\Delta_T$) does not exceed the first threshold ($Th_0$) and the bottom-field difference ($\Delta_B$) does not exceed the second threshold ($Th_1$), outputting the bottom-field current-frame pixel value ($P_{B1}$) for being merged with a corresponding pixel value of the copied top field of the current frame; and
    (h) if the top-field difference ($\Delta_T$) exceeds the first threshold ($Th_0$) or the bottom-field difference ($\Delta_B$) exceeds the second threshold ($Th_1$), outputting a weighted average of the top-field current-frame pixel value ($P_{T1}$) from the copied top field of the current frame and the bottom-field current-frame pixel value ($P_{B1}$) for being merged with a corresponding pixel value of the copied top field of the current frame.

11. The method as recited in claim 10, wherein the pixel values include chrominance values.

12. The method as recited in claim 10, wherein the pixel values include luminance values.

13. The method as recited in claim 10, wherein the to field previous-frame pixel value ($P_{T0}$) is an average of values of a plurality of neighboring pixels in the top field of the previous frame.

14. The method as recited in claim 10, wherein the top-field current-frame pixel value ($P_{T1}$) is an average of values of a plurality of neighboring pixels in the top field of the current frame.

15. The method as recited in claim 10, wherein the top-field difference ($\Delta_T$) and the bottom-field difference ($\Delta_B$) are absolute values.

16. The method as recited in claim 10, wherein the method is executed by texturing hardware in a graphics pipeline.

* * * * *

UNITED STATES PATENT AND TRADEMARK OFFICE
CERTIFICATE OF CORRECTION

PATENT NO. : 6,788,312 B1
APPLICATION NO. : 09/922759
DATED : September 7, 2004
INVENTOR(S) : Azar et al.

It is certified that error appears in the above-identified patent and that said Letters Patent is hereby corrected as shown below:

In the specification:
col. 1, line 11 insert --co-pending-- before "application" and after "a".

Signed and Sealed this

Thirtieth Day of March, 2010

David J. Kappos
*Director of the United States Patent and Trademark Office*